June 12, 1928.  D. F. FESLER  1,673,003

COUPLING

Filed April 11, 1921

Inventor:
Douglas F. Fesler
William Bradbury
See + McCabe  Attys.

Patented June 12, 1928.

1,673,003

UNITED STATES PATENT OFFICE.

DOUGLAS F. FESLER, OF EVANSTON, ILLINOIS, ASSIGNOR TO THE BASSICK MANUFACTURING CO., OF CHICAGO, ILLINOIS, A CORPORATION OF DELAWARE.

COUPLING.

Application filed April 11, 1921. Serial No. 460,281.

My invention relates to improvements in couplings, and is particularly concerned with improvements in that type of coupling which forms a part of a lubricating system comprising a plurality of nipples adapted to be secured to the various bearings to be lubricated, and a compressor for supplying lubricant to said nipples, the said compressor comprising a discharge conduit, the free end of which is provided with a nipple adapted to be successively attached to and detached from the nipples.

My invention is not, however, limited to this particular use, but is capable of being used wherever it is desired to provide a quick detachable sealed connection between two members designed to convey fluids of any kind.

The objects of my invention are:—

First; to provide a coupling member which can be quickly and easily attached to and detached from a nipple, or second coupling member.

Second; to provide a coupling embodying means for sealing the connection between the coupling and the second coupling member, of such character as to resist high pressures.

Third; to provide a coupling comprising means for preventing the escape of fluid from said coupling, this means being preferably in the form of a valve.

Fourth; to provide a construction such as described in which the valve is opened by the pressure of the fluid in the conduit, and Fifth; to provide a coupling of the character described which is simple in construction and economical to manufacture.

Other objects will appear as this description progresses, reference being had to the accompanying drawings, in which Figure 1 is a side elevation of a lubricating system embodying my improved coupling which is shown detached from a nipple secured to a bearing which is illustrated in cross-section.

Throughout the several figures, similar reference characters will be used for referring to similar parts.

Figure 1:
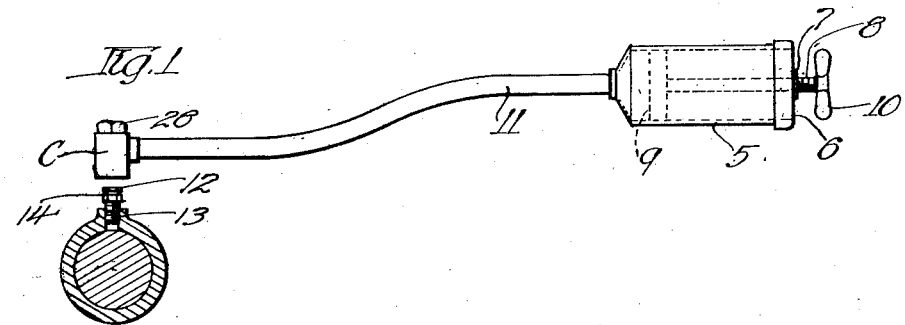
Figure 2:
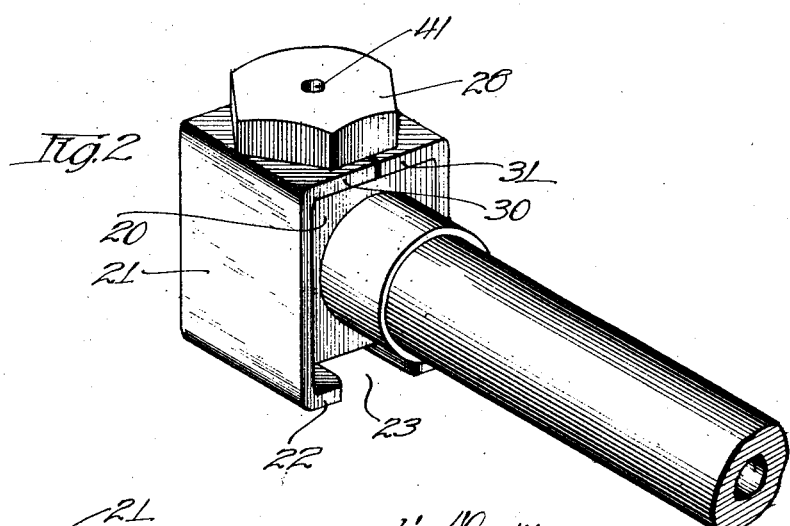
Figure 2 is a perspective view of my improved coupling.

Referring to the drawings, the lubricating system in connection with which I have illustrated my invention comprises a compressor having a cylindrical barrel 5 one end of which is provided with a cap 6, which can be removed for the purpose of filling the barrel 5. A threaded nut 7 extends through the cap 6 and coacts with the threaded rod 8, the inner end of which is provided with a plunger 9 of suitable construction. The outer end of the rod 8 is provided with a suitable handle 10 by means of which it can be rotated to place pressure upon the lubricant, in the barrel 5.

Figures 3, 4:
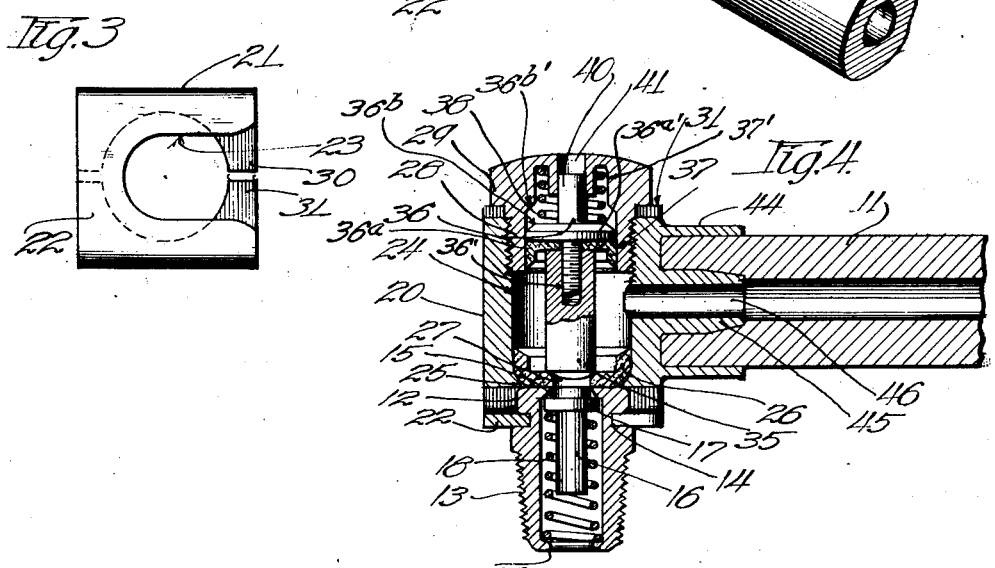
Figure 3 is a bottom view of a part thereof.
Figure 4 is a central longitudinal section.

A discharge conduit 11, preferably formed of flexible metallic hose or tubing, is connected with the end of the barrel 5 opposite the cap 6. The free end of the conduit 11 is provided with my improved coupling indicated as a whole in Figure 1 by the reference character C. This coupling member is adapted to be attached to and detached from nipples such as shown in Figures 1 and 4 which comprise a tubular member having a head 12 at one end, the other end of the tubular member being threaded as shown at 13 to provide means for securing it to a bearing. The head 12 is formed by an annular groove 14, the function of which will be referred to later on. An opening 15 is formed in the head of the nipple and is closed by a valve comprising a comparatively long cylindrical member 16, the outer end of which is flush with the top of the head. An annular flange 17 is formed intermediate the ends of the cylindrical member 16 and acts as an abutment for one end of the compression spring 18. The opposite end of this spring is confined by the inwardly flanged portion 19 of the threaded end of the nipple. It will be noted from an inspection of Figure 4 that the sides of the opening 15 are beveled so as to provide means for guiding the outer end of the valve 16 into its proper position for closing the opening 15 after it has been displaced inwardly by the pressure of the lubricant. By making the member 16 of considerable length and substantially the same diameter as the internal diameter of the compression spring 18, it is prevented from becoming inclined to the axis of the nipple to any considerable extent and thus insures its return to its proper position for closing the opening 15.

My improved coupling comprises a body member 20 of which a cross-section taken substantially transversely of the axis of the discharge conduit 11 is rectangular in form. A metal strap 21 is bent around the four sides of the body member, two of the oppositely disposed portions of this strap being of such length as to hold the portion 22 in spaced relation to the adjacent side of the body member 20 and substantially parallel therewith. A notch or opening 23 is cut in the portion 22 of the strap for receiving the neck of the nipple formed by the groove 14 referred to above. The sides of the head 12 overhang the portions of the strap adjacent the notch 23 as shown in Figure 4 and thus lock the coupling member to the nipple.

A bore 24 extends through the body member 20 and opens through one side thereof substantially in registry with notch or opening 23 formed in the strap. The walls of the end of the bore 24, adjacent the notch 23, are flanged inwardly as shown at 25 to provide a seat for the cup-leather or gasket 26. This gasket has a central aperture 27 which registers with the opening 15 in the head of the nipple when the coupling member is attached to the nipple, as shown in Figure 4.

A plug 28 is threaded into the opposite end of the bore 24 and comprises an overhanging flange 29 which serves to clamp the two opposed ends 30 and 31 of the strap 21 to the body member.

For the purpose of preventing the escape of lubricant from the compressor when the coupling C is detached from the nipple, I provide the valve 35 which is carried by the screw threaded projection 36' of the piston 36, which comprises the cup-leather 36$^a$ and the follower disc 36$^{a'}$, and is slidably mounted in a suitable bore 37 formed in the inner end of the cap 28, and is urged toward the gasket 26 by a compression spring 38 interposed between the piston 36 and the annular groove 37' forming a portion of bore 37.

The follower disc 36$^{a'}$ is beveled as indicated at 36$^b$ to provide a valve for co-acting with the valve seat 36$^{b'}$ to prevent the escape of lubricant past the valve disc 36$^b$ when it is forced into the bore 24 under high pressure. The cup-leather 36$^a$ provides additional means for preventing such escape of lubricant.

A guide rod 40 extends from the face of the piston 36 opposite the one which carries the valve 35 and slides in a bore 41 extending from the bore 37, through the outer face of the plug 28. Preferably the fit between the bore 41 and the guide rod 40 is such as to permit access of air to the bore 37.

The free end of the conduit 11 is soldered or otherwise secured to the annular flange 44 and the centrally arranged boss 45 which projects from one face of the body member 20. The boss 45 is provided with a bore 46 for establishing communication between the conduit 11 and the bore 24.

From the above description, it will be clear that as long as the pressure on the lubricant in the bore 24 does not exceed the compression of the spring 38, the valve 35 will close the aperture 27 in the gasket 26 thereby preventing the loss of lubricant from the compressor. This feature of my invention is of value where either oil or the more viscous lubricants, commonly designated as grease, are used. With the type of coupling disclosed, it is necessary, irrespective of the type of lubricant used, to substantially release the pressure on the lubricant before the coupling member can be detached from the nipple. If oil is the lubricant used and no valve was provided for closing the aperture 27, there would be more or less dripping of oil from the coupling which would be objectionable. Where grease is employed as the lubricant, it sometimes happens when the compressor is being filled that one or more air bubbles become incorporated in the grease filling the compressor and if the coupling member should happen to be disconnected from the nipple while one of these bubbles is compressed within the discharge conduit, it sometimes happens, and particularly during warm weather, that this bubble of grease will expand and force a slug of grease out of the discharge conduit.

My purpose in providing the closure for the aperture 27 in the gasket is to prevent this accidental loss of lubricant. The spring 38 can be made strong enough to securely seal the aperture 27 without noticeably requiring any increased effort on the part of the operator to force lubricant into the nipples.

The valve 35 performs another function, in that it imposes pressure upon the gasket 26 which tends to flex the central portion thereof outwardly, thereby causing an initial seal to be established between the gasket and the contacting face of the nipple when these two are brought into the relation shown in Figure 4. This initial seal prevents any lubricant from working its way in between the gasket and the contacting face of the nipple when the lubricant is first started through the aperture 27. This initial seal is subsequently increased when pressure is exerted upon the lubricant as it will be clear that the greater the pressure upon the lubricant, the tighter the gasket 26 will be held in contact with the nipple.

While I have described the details of construction in the preferred embodiment of my invention, it is to be clearly understood that my invention is not limited to these details but is capable of other adaptations and modifications within the scope of the appended claims.

Having thus described my invention, what I claim is:—

1. A coupling comprising a member having a bore extending therethrough, an inwardly extending flange at one end of said bore, an apertured gasket seating on the flange, a plug for closing the opposite end of said bore, the inner end of said plug having a bore formed therein, a piston slidable in said latter bore, one side of said piston being subject to the pressure of the fluid in said first-named bore, a valve extending from the last-mentioned side of said piston for closing the aperture in said gasket, a guide rod extending from the opposite side of said piston, there being a bore in said plug for receiving said guide rod, and a compression spring confined between said piston and said plug for yieldingly holding said valve against said gasket.

2. A coupling comprising a member having a bore extending therethrough, an inwardly extending flange at one end of said bore, an apertured gasket seating on the flange, a plug for closing the opposite end of said bore, the inner end of said plug having a bore formed therein, a piston slidable in said latter bore, one side of said piston being subject to the pressure of the fluid in said first-named bore, a valve extending from the last-mentioned side of said piston for closing the aperture in said gasket, and a compression spring confined between said piston and said plug for yieldingly holding said valve against said gasket.

3. A coupling comprising a member having a bore formed therein, means comprising an apertured gasket at one end of said bore for making a sealed connection with a second coupling, a piston at the other end of said bore, having one side subjected to the pressure of the fluid in said bore, a valve carried by said piston for closing the aperture in said gasket and means for yieldingly holding said valve in closed position.

4. A coupling comprising a member having a bore formed therein, means comprising an apertured gasket at one end of said bore for making a sealed connection with a second coupling, a piston at the other end of said bore, having one side subjected to the pressure of the fluid in said bore, and a valve carried by said piston for closing the aperture in said gasket.

5. A coupling comprising a body member having a bore formed therein, a flexible gasket at the open end of said bore for making a sealed contact with a second coupling, the said gasket being provided with an aperture, common means for closing the aperture in said gasket and establishing an initial seal between said gasket and said second coupling, and means actuated by the pressure of the fluid passing through said coupling, for opening said closing means.

6. A quick detachable coupling comprising a chamber, an exposed flexible gasket forming part of the outer wall of said chamber, said gasket having an aperture, means for clamping said coupling to another coupling with said gasket lying against the other coupling, resiliently held means for closing said aperture and pressing said gasket toward said other coupling, and means actuated by fluid pressure in said chamber for lifting said closing means away from said opening.

7. A quick detachable coupling comprising a chamber, an exposed flexible gasket forming part of the outer wall of said chamber, said gasket having an aperture, means for clamping said coupling to a second coupling with said gasket lying against the latter coupling, and resiliently held means for closing said aperture and pressing said gasket toward said other coupling, the effectiveness of said closing means being increased as said gasket is moved in a direction away from said second coupling.

In witness whereof, I hereunto subscribe my name this 22nd day of March, 1921.

DOUGLAS F. FESLER.